US010095954B1

(12) United States Patent
Daliyot et al.

(10) Patent No.: US 10,095,954 B1
(45) Date of Patent: Oct. 9, 2018

(54) TRAJECTORY MATCHING ACROSS DISJOINTED VIDEO VIEWS

(71) Applicant: Verint Systems Ltd., Herzilya Pituach (IL)

(72) Inventors: Shahar Daliyot, Rehovot (IL); Gadi Zimerman, Hod-Hasharon (IL); Shmuel Kiro, Rehovot (IL); Oren Golan, Or-Yehuda (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 323 days.

(21) Appl. No.: 13/743,635

(22) Filed: Jan. 17, 2013

Related U.S. Application Data (60) Provisional application No. 61/587,234, filed on Jan. 17, 2012.

(51) Int. Cl.
| | |
|---|---|
| *G06K 9/62* | (2006.01) |
| *G06T 7/292* | (2017.01) |
| *G06T 7/246* | (2017.01) |
| *G06K 9/32* | (2006.01) |

(52) U.S. Cl.
CPC ... *G06K 9/6201* (2013.01); *G06K 2009/3291* (2013.01); *G06T 7/246* (2017.01); *G06T 7/292* (2017.01); *G06T 2207/30232* (2013.01); *G06T 2207/30241* (2013.01)

(58) Field of Classification Search
CPC . G06T 2207/30241; G06T 2207/10016; G06T 7/2006; G06T 7/0081; G06T 7/20; G06T 7/0028; G06T 7/292; G06T 2207/30232; G06T 7/246; G06K 2009/3291

USPC .......................... 382/103, 107, 180, 224, 225
See application file for complete search history.

(56) References Cited

U.S. PATENT DOCUMENTS

| 8,098,888 | B1 * | 1/2012 | Mummareddy ... G06K 9/00778 |
| | | | 382/103 |
| 2005/0288911 | A1 * | 12/2005 | Porikli .............................. 703/2 |
| 2009/0043504 | A1 * | 2/2009 | Bandyopadhyay .... G01C 17/38 |
| | | | 701/469 |
| 2009/0245573 | A1 * | 10/2009 | Saptharishi ........ G06K 9/00771 |
| | | | 382/103 |

(Continued)

*Primary Examiner* — Kenny Cese
(74) *Attorney, Agent, or Firm* — Meunier Carlin & Curfman LLC (57) ABSTRACT

Embodiments disclosed herein provide systems and methods for matching trajectories across disjointed video views. In a particular embodiment, a method provides receiving a plurality of tagged trajectories that are tagged with an indicator of which trajectory pairs of the plurality of tagged trajectories are matching trajectory pairs and processing each of the trajectory pairs using each of a plurality of trajectory matching algorithms. The method further provides creating a model for matching trajectories based on the output of each of the plurality of trajectory matching algorithms for each of the pairs. The method further provides receiving a pair of trajectories and processing the pair of trajectories using each of the plurality of the trajectory matching algorithms. The method further provides processing the output of each of the plurality of the trajectory matching algorithms for the pair of trajectories using the model to determine whether the pair of trajectories is matching.

8 Claims, 7 Drawing Sheets

(56) References Cited

U.S. PATENT DOCUMENTS

| | | | |
|---|---|---|---|
| 2011/0091073 A1* | 4/2011 | Iwasaki | G06T 7/2006 382/103 |
| 2011/0115909 A1* | 5/2011 | Sternberg | G01S 3/7864 348/143 |
| 2011/0135154 A1* | 6/2011 | Wedge | G06K 9/6202 382/103 |
| 2012/0020518 A1* | 1/2012 | Taguchi | G06T 7/292 382/103 |
| 2012/0026335 A1* | 2/2012 | Brown | G01S 5/16 348/159 |
| 2012/0170802 A1* | 7/2012 | Millar | G06K 9/00785 382/103 |
| 2013/0016877 A1* | 1/2013 | Feris | G06K 9/00771 382/103 |

* cited by examiner

TRAJECTORY MATCHING ACROSS DISJOINTED VIDEO VIEWS

RELATED APPLICATIONS

This application claims the benefit of U.S. Provisional Application No. 61/587,234, filed Jan. 17, 2012, which is hereby incorporated by reference in its entirety.

TECHNICAL BACKGROUND

A video capture system, such as a video surveillance system, may include and receive video from multiple video capture sources, such as video cameras. These video cameras may be placed at various indoor or outdoor locations for monitoring various areas of interest. The video cameras are thereby able to also capture objects, such as people, animals, vehicles, or other items, that move through and within each region that is captured by each video camera.

A processing system of the video capture system may be able to recognize the objects that are captured by the video cameras. Moreover, the processing system may further be able track the movement of an object in a single captured region from one of the video cameras. However, the ability to track movement of the object in a single view does not further allow the processing system to track movement of the object if the object crosses multiple views that correspond to the multiple video cameras that capture video for the video processing system.

OVERVIEW

Embodiments disclosed herein provide systems and methods for matching trajectories across disjointed video views. In a particular embodiment, a method provides receiving a plurality of tagged trajectories that are tagged with an indicator of which trajectory pairs of the plurality of tagged trajectories are matching trajectory pairs and processing each of the trajectory pairs using each of a plurality of trajectory matching algorithms. The method further provides creating a model for matching trajectories based on the output of each of the plurality of trajectory matching algorithms for each of the trajectory pairs. The method further provides receiving a pair of trajectories and processing the pair of trajectories using each of the plurality of the trajectory matching algorithms. The method further provides processing the output of each of the plurality of the trajectory matching algorithms for the pair of trajectories using the model to determine whether the pair of trajectories is matching.

In some embodiments the method provides identifying the pair of trajectories, wherein identifying the pair of trajectories comprises, identifying a first trajectory associated with an object in video captured of a first region, and selecting a second trajectory from a plurality of trajectories associated with a plurality of objects in video captured of a second region.

In some embodiments the method provides identifying a plurality of alternative views of the object from the video of the first region and generating a first signature for the first trajectory from the plurality of alternative views of the object, wherein processing the pair of trajectories using each of the plurality of the trajectory matching algorithms comprises processing the first signature for the first trajectory and a signature for the second trajectory.

In some embodiments the method provides that the output of each of the plurality of the trajectory matching algorithms each comprises a distance computed between the pair of trajectories and a vector is created from the distances computed between the pair of trajectories for each algorithm.

In some embodiments the method provides that the model comprises a plurality of vectors for matching trajectory pairs of the plurality of tagged trajectories.

In some embodiments the method provides that processing the output of each of the plurality of the trajectory matching algorithms for the pair of trajectories using the model to determine whether the pair of trajectories is matching comprises comparing the vector to the plurality of vectors for matching trajectory pairs of the plurality of tagged trajectories.

In some embodiments the method provides, if the pair of trajectories is matching, generating a composite trajectory for the object based on the first trajectory and the second trajectory.

A further embodiment provides a video processing system comprising a training module configured to receive a plurality of tagged trajectories that are tagged with an indicator of which trajectory pairs of the plurality of tagged trajectories are matching trajectory pairs, process each of the trajectory pairs using each of a plurality of trajectory matching algorithms, and create a model for matching trajectories based on the output of each of the plurality of trajectory matching algorithms for each of the trajectory pairs. The video processing system further comprises a trajectory matching module configured to receive a pair of trajectories, process the pair of trajectories using each of the plurality of the trajectory matching algorithms, and process the output of each of the plurality of the trajectory matching algorithms for the pair of trajectories using the model to determine whether the pair of trajectories is matching.

Another embodiment provides a computer readable medium having instructions stored thereon for operating a video processing system, wherein the instructions, when executed by the video processing system, direct the video processing system to receive a plurality of tagged trajectories that are tagged with an indicator of which trajectory pairs of the plurality of tagged trajectories are matching trajectory pairs. The instructions further direct the system to process each of the trajectory pairs using each of a plurality of trajectory matching algorithms and create a model for matching trajectories based on the output of each of the plurality of trajectory matching algorithms for each of the trajectory pairs. The instructions further direct the system to receive a pair of trajectories, process the pair of trajectories using each of the plurality of the trajectory matching algorithms, and process the output of each of the plurality of the trajectory matching algorithms for the pair of trajectories using the model to determine whether the pair of trajectories is matching.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
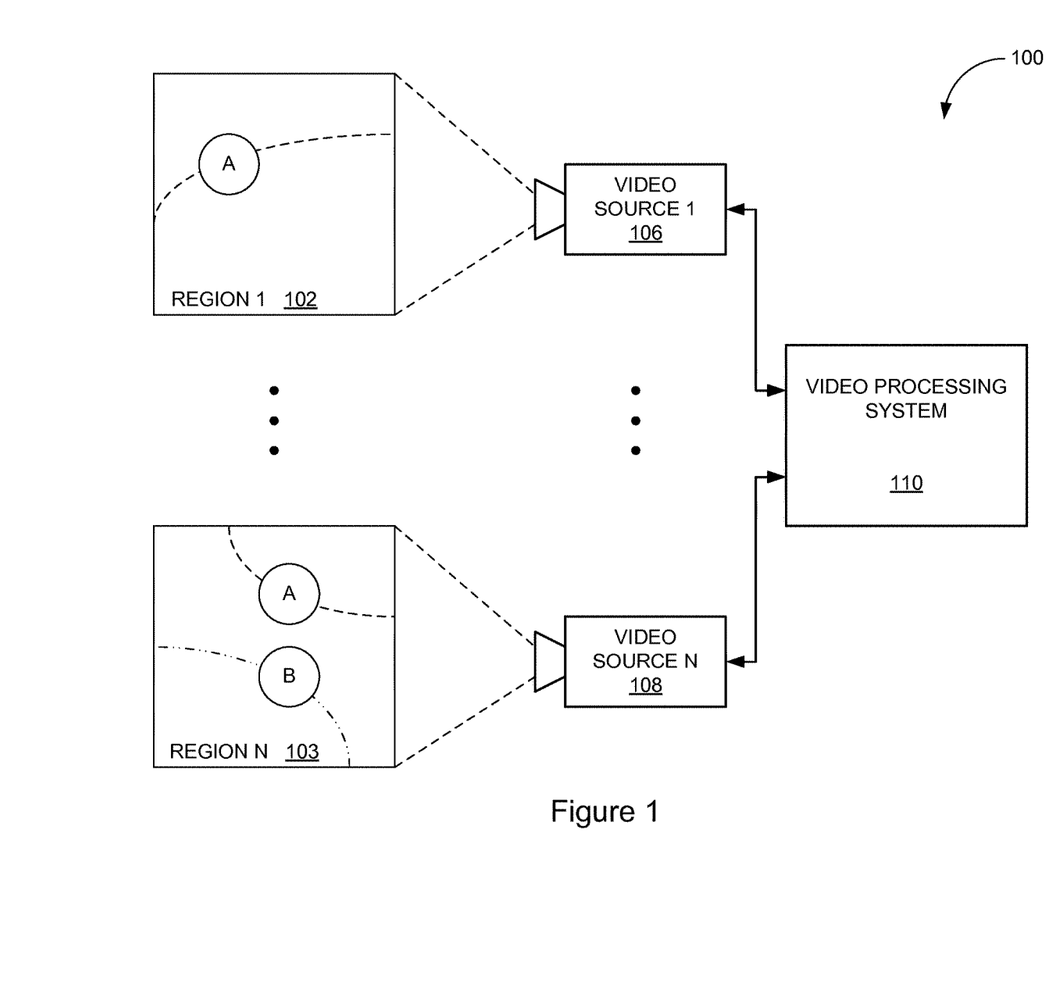
FIG. 1 illustrates a video system for matching trajectories across disjointed video views.

FIG. 1 illustrates a block diagram of an example of a video system 100 for matching trajectories across disjointed video views. Video system 100 includes video source 1 106, video source N 108, video processing system 110, and video storage system 112. Video source 1 106 is configured to capture video of region 1 102, while video source N 108 is configured to capture video of region N 104. Video source 1 106 and video source N 108 are coupled to video processing system 110.

In operation, video system 100 may be a video surveillance system or any other type of video capture system. Video system 100 captures video of regions 1-N from video sources 1-N, respectively. Regions 1-N may comprise various areas of interest to video capture system 100. The areas may be indoor, outdoor, or some combination thereof. The video is transferred from video sources 1-N to video processing system 110. Video processing system 110 is capable of identifying objects that are shown in the video captured of regions 1-N. Region 1 and region N may be overlapping, partially overlapping, abutting, or separate regions. Thus, the states of regions 1 and N as they are shown in FIG. 1 may not be contemporaneous since object A may be shown in both region 1 and region N at the same time if the regions overlap or object A may enter region N at some point after leaving region 1. Object A may be anything that can move on a trajectory through a video scene including a person, animal, vehicle, or some type of inanimate object.

Figure 2:
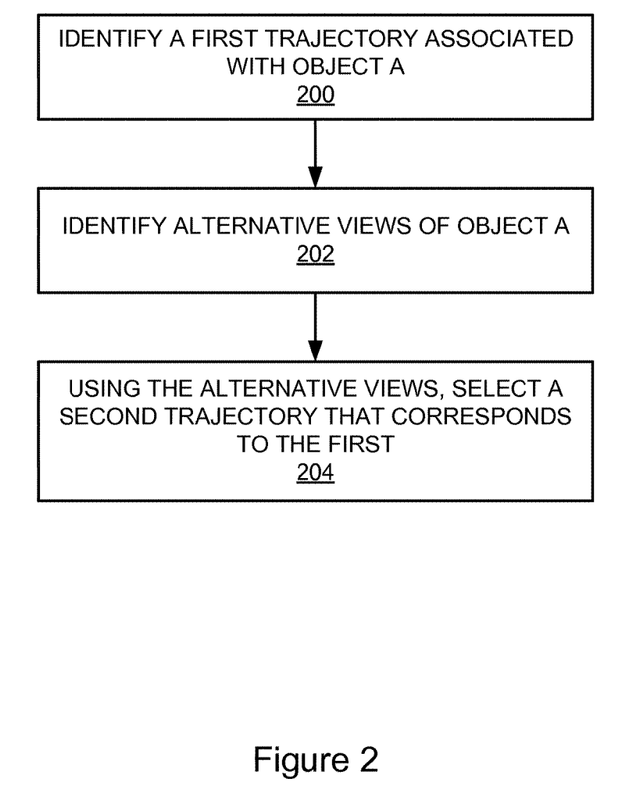
FIG. 2 illustrates the operation of a video system for matching trajectories across disjointed video views.

FIG. 2 illustrates the operation of video system 100 for matching trajectories across disjointed video views. Video source 1 captures video of region 1. The video includes any objects that may be located or passing through region 1, such as object A as shown in FIG. 1. Video source 1 transfers the video of region 1 to video processing system 110. The video may be transferred in real time for processing by video processing system 110, may be stored in video source 1 for transferring and processing at a later time, may be stored within processing system 110 for processing at a later time, or may be transferred to an unpictured video storage system for processing at a later time.

Upon receiving the video of region 1, video processing system 110 identifies a first trajectory associated with object A in the video captured of region 1 (step 200). The trajectory may be identified by processing system 110 tracking the movement of object A as it crosses through region 1 as the video of region 1 elapses. The trajectory of object A is represented by the dashed arc in region 1 but may take any path through or within region 1. Video processing system 110 may use various known forms of object detection in order to recognize object A within frames of the video in order to piece together the trajectory of object A in the video.

Additionally, video processing system 110 identifies a plurality of alternative views of object A from the video of region 1 (step 202). The alternative views provide further information about object A. As object A progresses along its trajectory in region 1, video source 1 may capture different views of object A caused both by movement of object A itself and positioning of video source 1. FIG. 1 highlights two exemplary views of object A that video source 101 may capture as object A passes through Region 1. For example, if video source 1 is a fixed position video camera and object A crosses region 1 perpendicularly to the view of video source 1, then video source 1 will be able to capture the front of object A as object A moves towards the location of video source 1, the side of object A as object A is directly in front of video source 1, and the back of object A as object A moves away from the location of video source 1 along with any angle of object A that occurs in between. Likewise, video source 1 will capture even further views of object A if object A repositions itself as object A moves along the trajectory. For example, if object A is a person, then the person may possibly turn around or turn his or her head while following the trajectory through region 1. Video processing system 110 is thereby able to identify additional views of the person from these motions.

Each view of the alternative views that are identified by video processing system 110 may be identified by processing the video of region 1 on a frame-by-frame basis to obtain information about a view of object A. In some embodiments, video processing system 110 may discard information about a view of object A that is repetitive. For example, object A may not change position enough from one frame to the next in order for the view of object A in the subsequent frame to be considered appreciatively different from the view of object A in the previous frame. Video processing system 110 may maintain a threshold value of change that information in a view of object A should surpass in order for that view to not be discarded. For example, if object A moves through region 1 at a rate significantly slower than the frame rate for the video, then the view of object A may not change in any significant way for multiple frames. Consequently, some intervening frames will be discarded by video processing system 110 because the intervening frames provide redundant information about a view of object A.

In view of the preceding example, some embodiments may only process a subset of the total frames of the video. Each frame of the subset of frames is spaced far enough apart in time to decrease the likelihood of adjoining frames in the subset having redundant view information about object A. Each frame of the subset of frames may still be processed to determine whether the frame should be discarded based on redundant view information contained within each frame. Alternatively, video processing system 110 may operate under the assumption that the frames are spaced far enough apart so as to render negligible any redundant view information that happens to still exist in the subset of frames.

After identifying the plurality of alternative views for object A, video processing system 110 uses the plurality of alternative views of object A to select a second trajectory of object A that corresponds to the first trajectory of object A from a plurality of trajectories associated with objects in video captured of region N (step 204). Video processing system 110 may identify the plurality of trajectories of objects in region N in the same manner described above for the trajectory of object A in region 1 by identifying alternative views for objects shown in region N. Specifically, video processing system 110 identifies the trajectories of objects A and B in region N.

Video processing system 110 performs a comparison between the trajectory determined for object A in region 1 with the trajectories determined for objects A and B in region N. The results of the comparison indicates to video processing system 110 that object A in region 1 is the same object as object A in region N and that the trajectory of object A in region 1 and the trajectory of object A in region N are part of a larger trajectory that spans at least region 1 and region N. The comparison uses the alternative views that are identified for object A in both region 1 and N to determine that object A is the same object in both regions. In other words, at least a portion of the alternative views identified for object A in region 1 will match, or closely match, a portion of the alternative views identified for object A in region N.

In contrast, a comparison of the alternative views identified for object B in region N with the alternative views identified for object A in region 1 will indicate that object B in region N is not the same object as object A in region 1.

Video processing system 110 may use various criteria to determine that the alternative views for object A in regions 1 and N comprise views of the same object. For example, video processing system 110 may maintain that a threshold number of alternative views captured of an object in two different regions should match in order for video processing system 110 to recognize the object as being the same object. Additionally, video processing system 110 may use image recognition processing when determining whether two individual alternative views match one another.

In some embodiments, video processing system 110 may receive and process video transferred from additional video sources that make up video sources 1-N. Similarly, video of each region 1-N that is captured by video sources 1-N may show more objects than the two objects A and B shown in FIG. 1. Thus, video processing system 110 may compare alternative views of many different objects captured from many different regions in order to identify matching trajectories for those objects across the regions.

Once video processing system 110 has identified that object A is the same object in both region 1 and N, video processing system 110 may be able to generate an composite trajectory for object A that includes the trajectories determined for object A in regions 1 and N. The composite trajectory may be generated using knowledge of the physical locations that are captured in regions 1 and N. For example, if video processing system 110 knows where regions 1 and N are located relative to each other and the direction in which video sources 1 and N are pointed, then video processing system 110 may be able to combine the trajectory of object A in region 1 with the trajectory of object A in region N to create a composite trajectory for object A. Additionally, the composite trajectory may include an estimation of a trajectory for object A in regions that are not covered by a video source.

Advantageously, the above embodiment allows for the generation of a composite trajectory for an object that is captured using views of the object captured by multiple disjointed video sources.

In some embodiments, video processing system 110 may display a graphical representation of the trajectory of object A. For example, video processing system 110 may display or transfer to another system for display of a map of the area captured by video sources 1-N with the trajectory of object A superimposed over the map. Alternatively, video processing system 110 may store the trajectory with or without the video captured of object A for later display or other type of dissemination.

Referring back to FIG. 1, video sources 106 and 108 comprise components capable of capturing video images of a scene. The components typically include a lens, image sensor, and a processor for interpreting the information received by the image sensor. Video sources 106 and 108 may each also include a user interface, memory device, software, processing circuitry, or some other components necessary for video sources 106 and 108 to operate as described herein. Video sources 106 and 108 may each be a video camera, a computer web cam, a digital camera, or some other device capable of capturing video images—including combinations thereof.

Video processing system 110 comprises a computer system, a video interface, and a communication interface. Processing system 110 may also include other components such a router, server, data storage system, and power supply. Processing system 110 may reside in a single device or may be distributed across multiple devices. Processing system 110 is shown externally to video sources 106 and 108, but system 110 could be integrated within the components of either or both of video sources 106 and 108. Processing system 110 could be a multipurpose workstation, dedicated computer system, application server, or any other type of processing system—including combinations thereof.

Communication links between the above elements use metal, glass, air, space, or some other material as the transport media. The communication links could use various communication protocols, such as Time Division Multiplex (TDM), Internet Protocol (IP), Ethernet, communication signaling, Universal Serial Bus (USB), Firewire, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. The communication links could be direct links or may include intermediate networks, systems, or devices.

Figure 3:
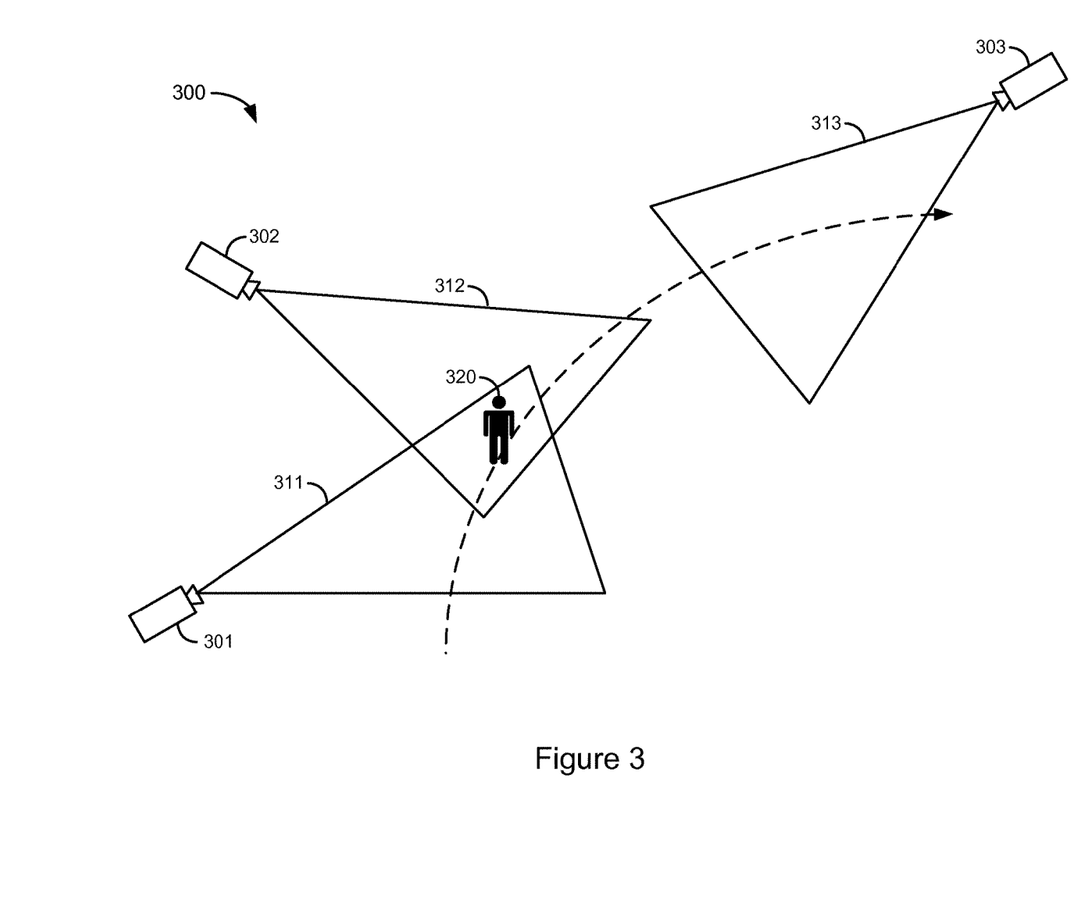
FIG. 3 illustrates a video system for matching trajectories across disjointed video views.

FIG. 3 illustrates a block diagram of video system 300 for matching trajectories across disjointed video views. Video system 300 includes video cameras 301-303. Video cameras 301-303 capture regions 311-313, respectively. Regions 311-313 are shown as triangular two-dimensional top down representations of the area that is captured by video cameras 301-303 but regions 311-313 may take any other shape. FIG. 3 further includes person 320 who moves through regions 311-313 along a trajectory represented by the dashed arc.

In operation, video cameras 301-303 capture video of regions 311-313. Video cameras 301-303 then transfer the captured video to video processing system 110, which identifies trajectories for objects that move within and through regions 311-313.

Figure 4:
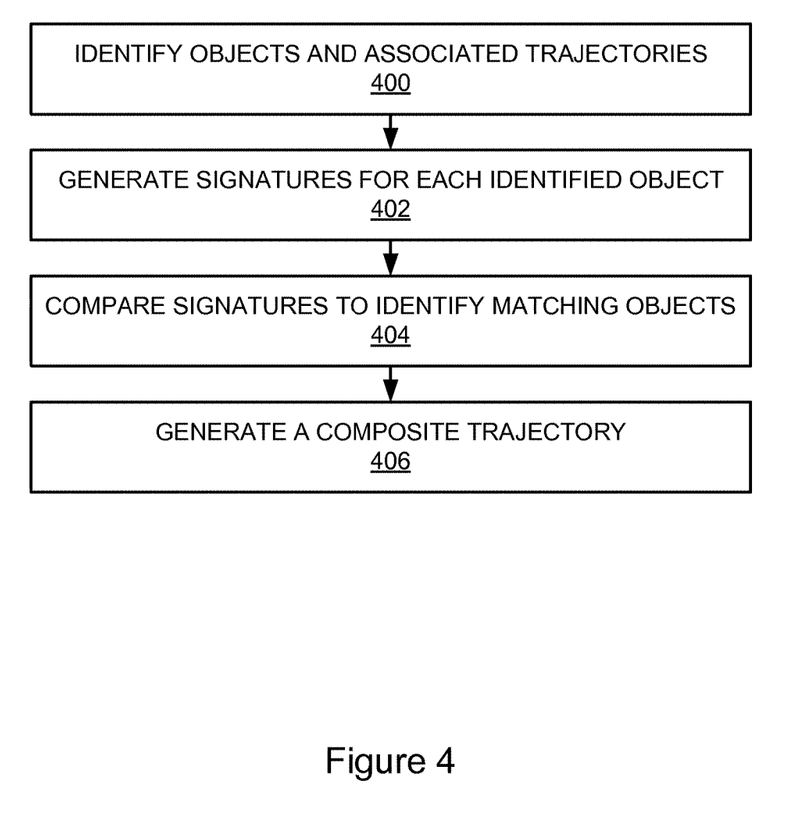
FIG. 4 illustrates the operation of a video system for matching trajectories across disjointed video views.

FIG. 4 illustrates the operation of video system 300 for matching trajectories across disjointed video views. In operation, video cameras 301-303 continuously capture video of regions 311-313 and transfer the video to the video processing system 110. Video processing system 110 identifies objects in the video and determines trajectories associated with the identified objects (step 400). While only person 320 is shown in FIG. 3 as passing through regions 311-313, it should be understood that during other time periods other objects, including multiple objects, may pass through regions 311-313 for recognition by video processing system 110.

In this example, video processing system 110 identifies person 320 as an object in the video of each region 311-313. Additionally, video processing system 110 associates person 320 with a portion of the dashed line representing the trajectory of person 320 in each of regions 311-313, respectively. Thus, at this stage in the processing, video processing system 110 has merely recognized that an object has passed through each of regions 311-313 and has not yet recognized that the object is the same person 320.

Either after or concurrent to identifying objects and associated trajectories, video processing system generates a signature for each object (step 402). A signature is derived from models of the object with each model corresponding to a view of the object in a video frame. The information that composes a model is an estimation of how the object would look from a particular view point. The information may be derived from various algorithms that are used for image matching or may be a portion of the video frame itself that shows the object in the particular view point.

In this example, three signatures are created for person 320. One signature is completed for the trajectory of person 320 in region 311, a second signature is created for the trajectory of person 320 in region 312, and a third signature is created for the trajectory of person 320 in region 313. In some embodiments, video processing system 110 may be aware of the overlap between regions 311 and 312. Consequently, video processing system 110 may be able to recognize that an object identified in the overlapping area is the same object without the need for further object recognition. The signature for person 320 in either or both of regions 311 and 312 may therefore be enhanced with additional views for person 320 from the other region.

Figure 5:
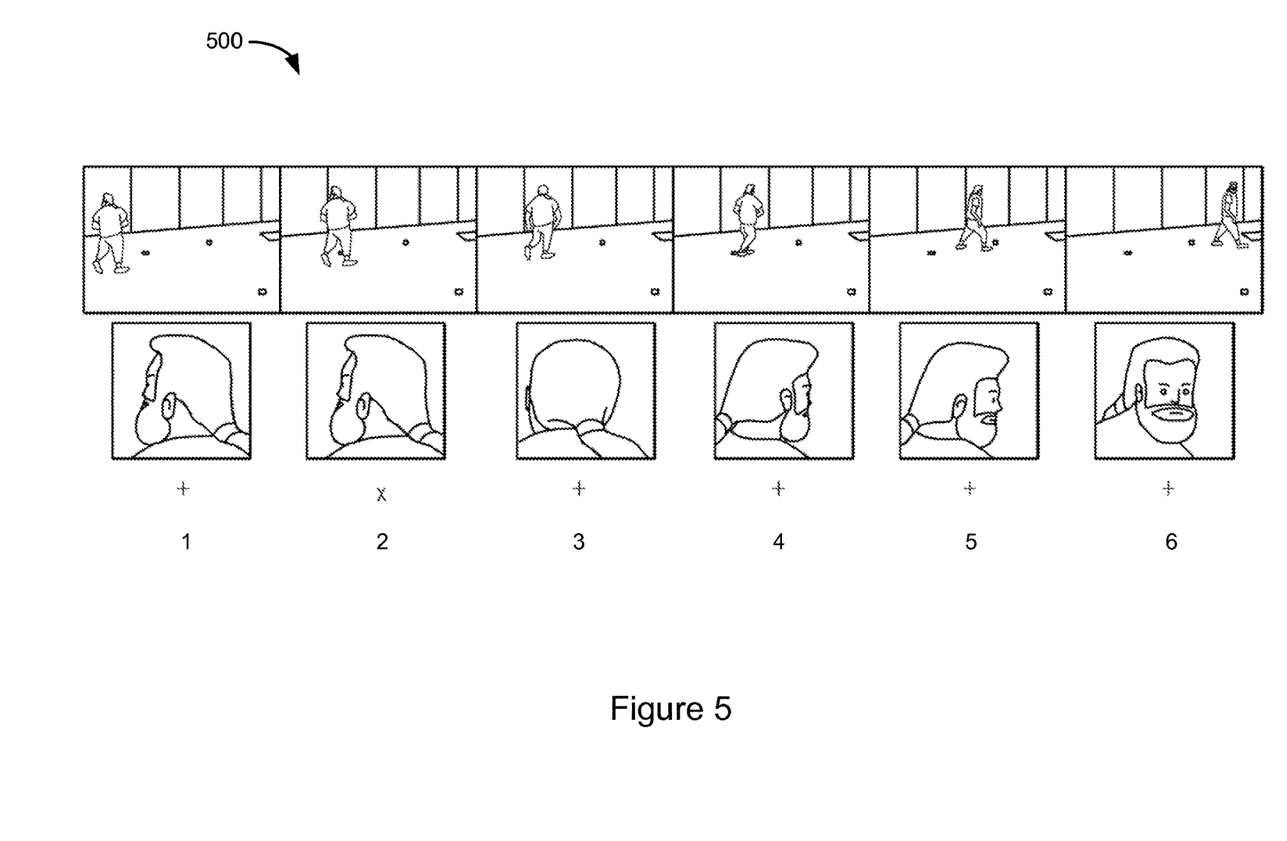
FIG. 5 illustrates a video frame set for matching trajectories across disjointed video views.

FIG. 5 illustrates frame set 500 in an example of person 320 walking on a trajectory through one of regions 311-313. Specifically, frame set 500 displays video frames 1-6, which may be all or merely an exemplary subset of the total frames processed for the region. While frames 1-6 show the entire body of person 320, video processing system 110 in this example is only concerned with the head of person 320 when creating a signature of person 320. Other embodiments may consider a larger portion of the body of person 320. Moreover, when video processing system 110 creates a signature for person 320, video processing system 110 only creates models for use in the signature that provide additional information about the head of person 320. Therefore, since frame 2 shows the head of person 320 in a position similar to that of frame 1, frame 2 does not provide information additional to the information already provided by frame 1 and a model is not created using frame 2. Accordingly, a signature for person 320 in this example region is created using models derived from video frames 1 and 3-6.

Referring back to FIG. 4, once video processing system 110 has generated a signature for person 320 in each of regions 311-313, video processing system 110 compares the signatures to determine whether person 320 in the video of each region matches person 320 in the other regions (step 404). Two signatures are compared by comparing all models that comprise one signature to all models that comprise the other signature. The results of these individual model comparisons are aggregated and, if the aggregated comparisons are within a threshold range of similarity, then the signatures are considered signatures for the same object.

In the example of FIG. 3, the comparison of signatures for person 320 in regions 311-313 will result in video processing system 110 determining that person 320 is the same person across each of regions 311-313. In contrast, if another person walks through region 313 at any time, then video processing system 110 will create and compare a signature for that person to the signature of person 320 from regions 311 and 312 to determine that the other person is not the same as person 320.

In some embodiments, once two signatures are considered to be equivalent, the two signatures may be combined in such a way as to create a more precise signature that contains models of person 320 that contain information previously exclusive to one of the signatures. For example, if a second signature contains models of person 320 that contain information about the left side of person 320 and the first signature only has models with information about the right side of person 320, then the right side models of the second signature may be integrated into the first signature to create a more complete signature of person 320 for use in further signature comparisons.

After determining that person 320 is the same object in each region 311-313, video processing system 110 can create a composite trajectory for person 320 that spans the three regions 311-313 (step 406). Furthermore, when creating the composite trajectory, video processing system 110 may also estimate the trajectory of person 320 when person 320 is not located in one of regions 311-313, such as is the case in the space between region 312 and 313. Thus, even if the trajectory of an object is not able to be captured by at least one video camera for the entirety of its trajectory, video processing system 110 is still able to track the trajectory of the object across the gaps in regions of video coverage.

Figure 6A:
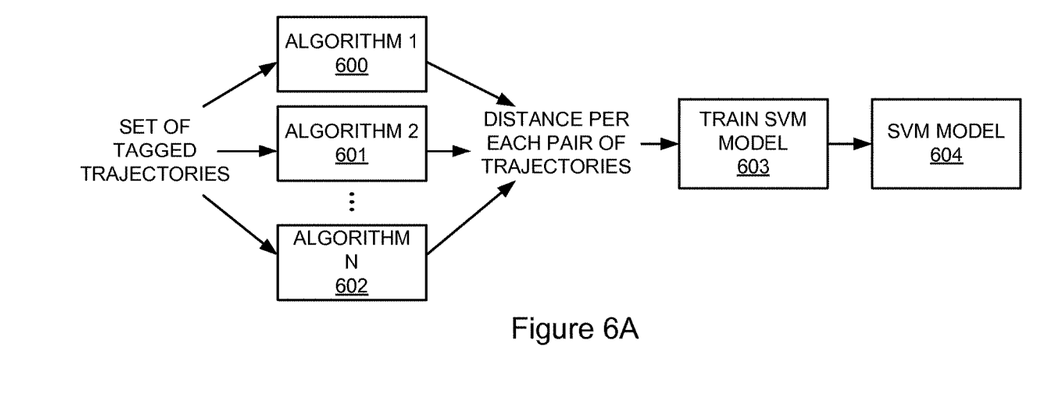
FIGS. 6A and 6B illustrate a black box approach for matching trajectories across disjointed video views.
Figure 6B:
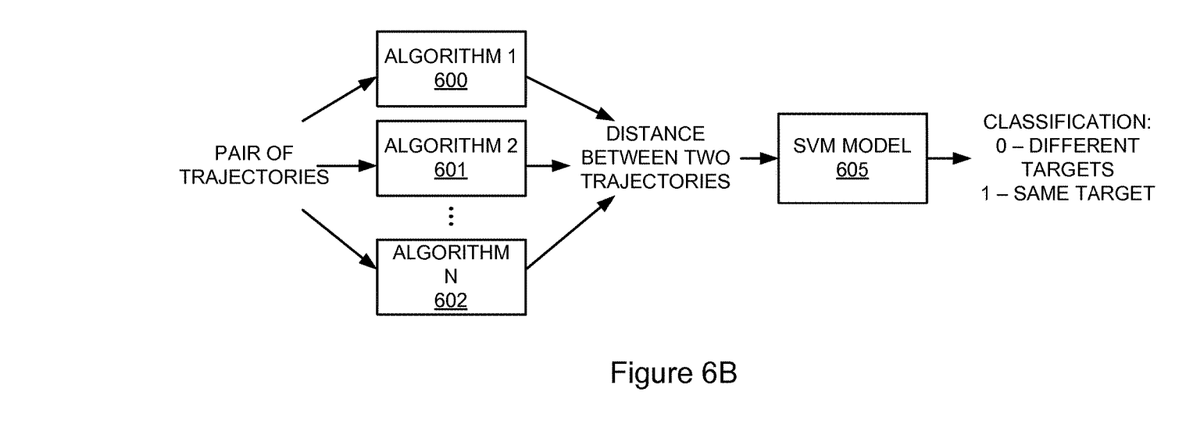

FIGS. 6A and 6B illustrate a black box approach that video processing system 110 may use for matching trajectories across disjointed video views. In particular, FIG. 6A illustrates a block diagram for training a support vector machine (SVM) to use a combination of multiple trajectory matching algorithms to match the trajectories of an object as discussed above. FIG. 6B then illustrates using the trained SVM model to determine whether a pair of trajectories are matching trajectories (i.e. trajectories that are part of a composite trajectory for the same object). The method described in FIGS. 6A and 6B is considered a black box approach because the method does not require knowledge of the actual algorithms that are used for matching trajectories.

In training operation, video processing system 110 is provided with a set of trajectories that are tagged as being trajectories that is manner that allows video processing system 110 to know which pairs of trajectories in the set are matching. In accordance with FIG. 6A the set of tagged trajectories is fed into blocks 600-602 so that the tagged trajectories can be processed by trajectory matching algorithms 1-N. Each of algorithms 1-N independently processes every possible combination of trajectory pairs from the tagged trajectories and produces a distance of similarity for each pair. Algorithms 1-N may process a signature for each trajectory, like the trajectory signatures discussed above, or may process some other defining aspect of each trajectory.

Once the trajectory pair distances have been determined, the trajectory pair distances are used to train the SVM model at block 603. Since the trajectories are tagged, video processing system 110 knows which trajectory pair distances apply to the distances between trajectory pairs that are matching and those that are not matching as computed by each algorithm. Thus, each possible trajectory pair combination will have a distance computed for it by each of the N algorithms. Knowledge of which distances apply to matching pair combinations for each algorithm allows video processing system 110 to set vectors in the SVM model. A vector is set so that each distance for a particular matching pair calculated by each algorithm are used when setting the vector so that the vector is a combination of the results of all N algorithms. Once the vectors are set for all matching pairs, the SVM model is ready for use at block 604.

FIG. 6B illustrates the operation of video processing system 110 using the SVM model that was created in FIG. 6B. Video processing system 110 receives a pair of trajectories for comparison. As was the case with the training, these trajectories may comprise trajectory signatures like those discussed previously. Video processing system 110 processes the pair of trajectories using the same algorithms 1-N in blocks 600-602 as were used to train the SVM model. Each algorithm produces a distance for the pair of trajectories and those distances are fed into the SVM model at block 605. Block 605 uses the distances to create a vector for the pair of trajectories and compares that vector to the vectors created when training the SVM model. If the vector matches a vector for a matching trajectory, then the pair of trajectories is assigned a 1 for being a matching pair. However, if the vector does not match a vector for a matching trajectory or matches a vector for an unmatching trajectory, then the pair of trajectories is assigned a 0 for being an unmatching pair. While the above example uses 1 and 0, other indicators for matching trajectories may be used.

Figure 7:
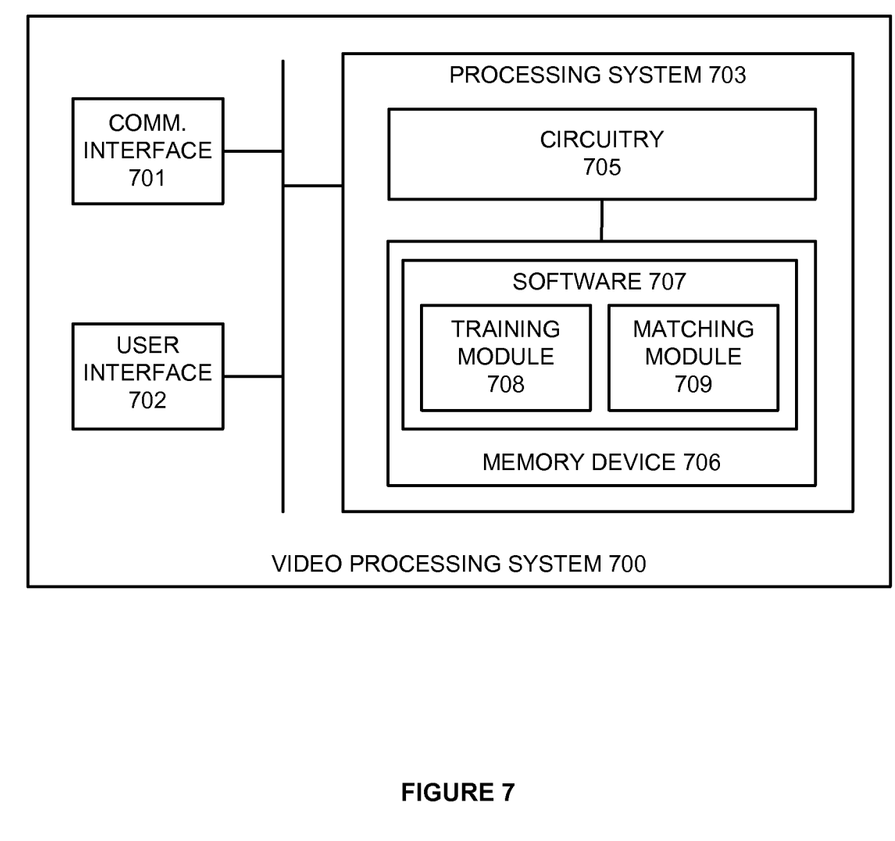
FIG. 7 illustrates a video processing system for matching trajectories across disjointed video views.

FIG. 7 illustrates video processing system 700. Video processing system 700 is an example of video processing system 110, although control system 110 may use alternative configurations. Video processing system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software includes training module 708 and matching module 709. Operating software 707 may further include an operating system, utilities, drivers, network interfaces, applications, or some other type of software. When executed by circuitry 705, operating software 707 directs processing system 703 to operate video processing system 700 as described herein.

In particular, training module 708 directs processing system 703 to receive a plurality of tagged trajectories that are tagged with an indicator of which trajectory pairs of the plurality of tagged trajectories are matching trajectory pairs, process each of the trajectory pairs using each of a plurality of trajectory matching algorithms, and create a model for matching trajectories based on the output of each of the plurality of trajectory matching algorithms for each of the trajectory pairs. Matching module 709 directs processing system 703 to receive a pair of trajectories, process the pair of trajectories using each of the plurality of the trajectory matching algorithms, and process the output of each of the plurality of the trajectory matching algorithms for the pair of trajectories using the model to determine whether the pair of trajectories is matching.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for tracking the trajectory of an object moving in regions covered by a video surveillance system, the method comprising:

locating objects in video captured by a first camera covering a region;

generating a signature for each object in the region, wherein the signature for each object comprises views of the object obtained from a subset of frames selected from the video of the region, and wherein each view of the object is a portion of a video frame that shows the object from a particular view point, and wherein the frames in the subset of frames are spaced apart in time to decrease the likelihood of redundant views in the signature;

computing a trajectory for each object in the region from the captured video;

determining that a particular object that traced a trajectory in the region has also traced a trajectory in another region, wherein the determining comprises:

locating objects in video captured by a second camera covering the other region, generating a signature for each object in the other region, wherein the signature for each object in the other region comprises views of the object obtained from a subset of frames selected from the video captured by the second camera covering the other region, wherein the frames in the subset of frames are spaced apart in time to decrease the likelihood of redundant views in the signature, comparing the signatures from the region to the signatures from the other region to find a match, the match determined by a number of matching views exceeding a threshold, and updating the signature for the particular object by adding views of the particular object in the other region, wherein only views of the particular object in the other region that are different from the views already contained in the signature of the particular object are added;

creating a composite trajectory for the particular object that includes the trajectory in each region and an estimation of the trajectory between the region and the other region not covered by the first camera or the second camera;

repeating the determining and creating for other regions using the updated signature for the particular object so that as the particular object is tracked its signature is expanded to include different views of the particular object; and displaying a map of the region and the other region with the composite trajectory of the object superimposed over the map.

2. The method according to claim 1, wherein comparing comprises image recognition.

3. The method according to claim 1, wherein the object is a person and the views are of the person's head.

4. A non-transitory computer readable medium having instructions stored thereon for operating a video processing system, wherein the instructions, when executed by the video processing system, direct the video processing system to:

locate objects in video captured by a first camera covering a region;

generate a signature for each object in the region, wherein the signature for each object comprises views of each object obtained from a subset of frames selected from the video of the region, and wherein each view of each object comprises a portion of a video frame that shows the object from a particular view point, and wherein the frames in the subset of frames are spaced apart in time to decrease the likelihood of redundant views in the signature;

compute a trajectory for each object in the region from the captured video;

determine that a particular object that traced a trajectory in the region has also traced a trajectory in another region, wherein the determining directs the video processing system to:

locate objects in video captured by a second camera covering the other region, generate a signature for each object in the other region, wherein the signature for each object in the other region comprises views of the object obtained from a subset of frames selected from the video captured by the second camera covering the other region, wherein the frames in the subset of frames are spaced apart in time to decrease the likelihood of redundant views in the signature, compare the signatures from the region to the signatures from the other region to find a match, the match determined by a number of matching views exceeding a threshold, and update the signature for the particular object by adding views of the particular object in the other region, wherein only views of the particular object in the other region that are different from the views already contained in the signature of the particular object are added;

create a composite trajectory for the particular object that includes the trajectory in each region and an estimation of the trajectory between the region and the other region not covered by the first camera or the second camera;

repeat the determining and creating for other regions using the updated signature for the particular object so that as the particular object is tracked its signature is expanded to included different views of the particular object; and display a map that includes the region and the other region with the composite trajectory of the object superimposed over the map.

5. The non-transitory computer readable medium according to claim 4, wherein comparing comprises image recognition.

6. The non-transitory computer readable medium according to claim 4, wherein the object is a person and the views are of the person's head.

7. The method according to claim 1, wherein the frames in the subset of frames are spaced apart in time according to a rate of motion of the object relative to a camera frame rate.

8. The non-transitory computer readable medium according to claim 4, wherein the frames in the subset of frames are spaced apart in time according to a rate of motion of the object relative to a camera frame rate.

* * * * *